United States Patent
Prokhorov

(10) Patent No.: US 8,538,901 B2
(45) Date of Patent: Sep. 17, 2013

(54) METHOD FOR APPROXIMATION OF OPTIMAL CONTROL FOR NONLINEAR DISCRETE TIME SYSTEMS

(75) Inventor: Danil V. Prokhorov, Canton, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 859 days.

(21) Appl. No.: 12/701,222

(22) Filed: Feb. 5, 2010

(65) Prior Publication Data

US 2011/0196819 A1     Aug. 11, 2011

(51) Int. Cl.
| | |
|---|---|
| G06E 1/00 | (2006.01) |
| G06E 3/00 | (2006.01) |
| G06F 15/18 | (2006.01) |
| G06G 7/00 | (2006.01) |
| G05B 13/02 | (2006.01) |
| G06N 3/00 | (2006.01) |

(52) U.S. Cl.
USPC ............................ 706/23; 706/30; 700/48

(58) Field of Classification Search
USPC ................... 706/23, 30, 48; 700/48
See application file for complete search history.

(56) References Cited

U.S. PATENT DOCUMENTS

| | | | |
|---|---|---|---|
| 5,465,204 A | | 11/1995 | Sekine et al. |
| 5,848,402 A | | 12/1998 | Pao et al. |
| 6,088,689 A | | 7/2000 | Kohn et al. |
| 6,169,981 B1 | * | 1/2001 | Werbos ............................ 706/23 |
| 6,453,308 B1 | | 9/2002 | Zhao et al. |
| 6,601,051 B1 | * | 7/2003 | Lo et al. .......................... 706/30 |
| 7,043,462 B2 | | 5/2006 | Jin et al. |
| 7,395,251 B2 | * | 7/2008 | Linsker ............................ 706/23 |
| 2008/0172349 A1 | * | 7/2008 | Prokhorov ...................... 706/23 |
| 2010/0023307 A1 | * | 1/2010 | Lee et al. ......................... 703/7 |

OTHER PUBLICATIONS

Becerikli, Y. et al. "Intelligent optimal control with dynamic neural networks". Neural Networks 16, pp. 251-259. 2003.*

Mastorocostas, P.A. et al. "A Recurrent Fuzzy-Neural Model for Dynamic System Indentification", IEEE Transactions on Systems, Man and Cybernetics—Part B: Cybernetics, vol. 32, No. 2, pp. 176-190, Apr. 2002.*

Dos Santos, E.P. et al. "Efficient Second-Order Learning Algorithms for Discrete-Time Recurrent Neural Networks", in L.R. Medsker and L.C. Jain (eds.) Recurrent Neural Networks: Design and Applications, CRC Press, pp. 47-75, ISBN: 0-8493-7181-3, 2000.*

Wang, J. et al. "A multilayer recurrent neural network for solving continuous-time algebraic Riccati equations", Neural Networks 11, pp. 939-950. 1998.*

Izadi, H. et al. "Optimal Neuro-Controller in Longitudinal Autolanding of a Commercial Jet Transport". pp. 492-497. IEEE. 2003.*

(Continued)

*Primary Examiner* — Jeffrey A Gaffin
*Assistant Examiner* — Benjamin Buss
(74) *Attorney, Agent, or Firm* — Gifford, Krass, Sprinkle, Anderson & Citkowski, P.C.

(57) ABSTRACT

A method for approximation of optimal control for a nonlinear discrete time system in which the state variables are first obtained from a system model. Control sequences are then iteratively generated for the network to optimize control variables for the network and in which the value for each control variable is independent of the other control variables. Following optimization of the control variables, the control variables are then mapped onto a recurrent neural network utilizing conventional training methods.

9 Claims, 1 Drawing Sheet

(56) References Cited

OTHER PUBLICATIONS

Kumar, R.R. et al. "Artificial Neural Networks in Space Station Optimal Attitude Control". Acta Astronautica vol. 35, No. Z/3, pp. 107-I 17, 1995.*

Haghgoeian, F. "Real-Time Model of Artificial Neural Networks Based Speed Estimator for an Induction Machine Drive", Thesis, University of Quebec at Chicoutimi. 143 pages. 2005.*

Haykin, S. "Neural Networks: A Comprehensive Foundation" Second Edition. pp. 732-739. 1999.*

Samuelides, M. "Neural Identification of Controlled Dynamical Systems and Recurrent Networks." In Neural Networks, pp. 231-287. Springer Berlin Heidelberg, 2005.*

Wan, E.A. et al. "Model predictive neural control for aggressive helicopter maneuvers." Software Enabled Control: Information Technologies for Dynamical Systems, pp. 175-200. 2003.*

Bogdanov, A. "Optimal control of a double inverted pendulum on a cart." Oregon Health and Science University, Tech. Rep. CSE-04-006, OGI School of Science and Engineering, Beaverton, OR. 2004.*

Srinivasan, B. et al. "Back propagation through adjoints for the identification of nonlinear dynamic systems using recurrent neural models." IEEE Transactions on Neural Networks, vol. 5, No. 2, pp. 213-228. 1994.*

Panos J. Antsaklis et al.; On Hybrid Control of Complex Systems: A Survey; Technical Report of the ISIS Group at the University of Notre Dame; ISIS-97-017; Dec. 1997; pp. 1-12.

Bor-Sen Chen et al.; Robustness Design of Nonlinear Dynamic Systems via Fuzzy Linear Control; IEEE Transactions on Fuzzy Systems, vol. 7, No. 5, Oct. 1999; pp. 571-585.

* cited by examiner

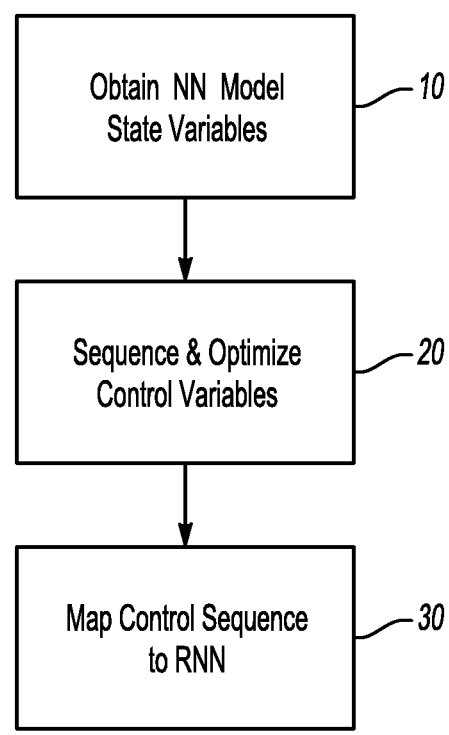

METHOD FOR APPROXIMATION OF OPTIMAL CONTROL FOR NONLINEAR DISCRETE TIME SYSTEMS

BACKGROUND OF THE INVENTION

I. Field of the Invention

The present invention relates to a method for approximating optimal control variables of a nonlinear discrete time system.

II. Description of Related Art

The use of neural networks simulated by one or more processors has enjoyed increased popularity for the control of discrete nonlinear time systems. Such neural networks are defined by a plurality of nodes having one or more inputs and one or more outputs. In recurrent neural networks, at least one of the outputs forms a feedback input to the network.

In order to obtain the appropriate weights for each of the nodes in the neural network, it has been previously necessary to train the neural network using conventional training techniques. These techniques include, for example, applying known or desired state variables and training the network to produce known or desired outputs.

One disadvantage to recurrent neural networks, however, is that, due to the feedback inherent in a recurrent neural network, training of the neural network provides feedback/parameterized solutions for the network in which the control variables are necessarily dependent on each other. This, however, oftentimes results in solutions for the neural network having local minima. Such local minima, of course, are undesirable and detract from the overall operation of the neural network.

SUMMARY OF THE PRESENT INVENTION

The present invention provides a method for the approximation of optimal control for nonlinear discrete time systems which overcomes the above-mentioned disadvantages of the previously known methods.

In brief, in the method of the present invention, the state variables are first obtained offline from a system model. These state variables may be either obtained directly from the system data itself or by experimentation on a high fidelity system simulator.

Control sequences are then iteratively generated to optimize desired control variables for subsequent training of a recurrent neural network. During this generation of control sequences, the value of each control variable is independent of the other control variables for the network.

After optimization of the independent control variables, the independent control variables are then mapped onto a recurrent neural network implemented by a processor using conventional training methods.

Since the control variables are independent of each other during the optimization step, the previously known occurrences of local minima using less than optimal control variables are eliminated.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

The sole FIGURE is a flowchart illustrating the operation of the present invention.

DETAILED DESCRIPTION OF A PREFERRED EMBODIMENT OF THE PRESENT INVENTION

With reference to the drawing, at step 10 a neural network model is first identified and the state variables, i.e., the conditions of the neural network, are obtained. The neural network model may be obtained from a system itself or by experimentation in a high fidelity system simulator.

The neural network (N) model obtained at step 10 has the following form:

$$x(n+1)=f(x(n),u(n))$$

$$y(n+1)=h(x(n+1)) \qquad (1)$$

where both f and h are differentiable functions, and the dimensionality of the vector y (the output vector) is usually much smaller than that of the vector x (the internal state vector), e.g., dim(y)=2 and dim(x)=10. The reason for that may be understood from this observation. Suppose that the NN model does not have the output vector-function h, and some of its states are assigned to approximate the system outputs, and such outputs are termed state-outputs $x_o$. When such NN is tasked with approximation of a complicated nonlinear system, it is usually very easy to obtain a good match between the NN state-outputs and the system outputs because the NN often "cheats" by producing $x_o(n+1) \approx x_o(n)$ which are just the delayed versions of $x_o$. Such NN is usually a poor approximator of other properties of the system, e.g., Jacobians, etc. The NN is prevented from "cheating" by eliminating the state-outputs altogether and adopting the architecture (1).

After identification of the neural network model and state variables at step 10, step 10 proceeds to step 20. At step 20, the control variables are optimized by iteratively generating control sequences and in which each control variable is independent of the other control variables in the sequence.

More specifically, in order to generate the control sequences, the original algorithm uses actual equations of the system (while we employ its NN model) which is supposed to be linearized many times at different operating points along the system trajectories. The algorithm is both effective and efficient, as it will become apparent from the description below.

The algorithm assumes the standard quadratic performance index to be minimized over time n=1, 2, . . . , N:

$$J(n) = \sum_{i=n}^{N-1} L(x(i), u(i), i) + \varphi(x(N)) \qquad (2)$$

$$L(x(n), u(n), n)) = \frac{1}{2}\Delta x^T(n)Q(n)\Delta x(n) + \Delta u^T(n)R(n)\Delta u(n) \qquad (3)$$

and the terminal condition $$\varphi(x(N)) = \frac{1}{2}\Delta^T(N)Q(N)\Delta x(N) \qquad (4)$$

where the weighting matrices Q(n)>0, R(n)>0, the difference vectors $\Delta x(n)=x(n)-x^d(n)$, $\Delta u(n)=u(n)-u^d(n)$, and $x^d(n)$, $u^d(n)$ are target state and control sequences (if specified; often they are all zero with the exception of $x^d(N)$).

The constraint on the index minimization is specified as $$x(n+1)=f(x(n),u(n)) \quad (5)$$

where $f \in C^1$. Note that this system does not have the output function h as in (1), but this demonstrates the essence of the approach without the complication of the output function.

The control theoretic approach to this problem is based on solving first order (necessary) optimality conditions by employing the Riccati equation. For completeness, the derivation for the optimal control sequence is shown below.

$$x(n+1)=A(n)x(n)+B(n)u(n) \quad (6)$$

$$\lambda^T(n)=\Delta x^T(n)Q(n)+\lambda^T(n+1)A(n) \quad (7)$$

$$\delta J(n)/\delta u(n)=\Delta u^T(n)R(n)+\lambda^T(n+1)B(n)=0 \quad (8)$$

where $A(n)=f_x(x(n), u(n))$ is the state Jacobian of f, $B(n)=f_u(x(n),u(n))$ is the control Jacobian of f, and $\lambda^T(n)=\delta J(n)/\delta x(n)$ is the adjoint state vector.

The dynamics (6) runs forward in time with initial condition $x(0)$, whereas the adjoint dynamics (7) runs backward in time with final condition $\lambda^T(N)=\Delta x^T(N)Q(N)$. From (8) we obtain $$u(n)=u^d(n)-R^{-1}(n)B^T(n)\lambda(n+1) \quad (9)$$

The classic two-point boundary value problem is obtained below by substituting (9) into (6) and (7):

$$x(n+1)=A(n)x(n)-B(n)R^{-1}(n)B^T(n)\lambda(n+1)+B(n)u^d(n) \quad (10)$$

$$\lambda^T(n)=Q(n)x(n)+A^T(n)\lambda(n+1)-Q(n)x^d(n) \quad (11)$$

The system above is usually solved by the sweep method [1] based on the assumed form for the adjoint vector:

$$\lambda(n)=P(n)x(n)+s(n) \quad (12)$$

where $P(n)$ and $s(n)$ are determined from the process below. First, the final values of P and s are set: $P(N)=Q(N)$ and $s(N)=-Q(N)x^d(N)$. Substituting (12) in (10) yields $$x(n+1)=M(n)A(n)x(n)+v(n) \quad (13)$$

where $$M(n)=(I+B(n)R^{-1}(n)B^T(n)P(n+1))^{-1} \quad (14)$$

$$v(n)=M(n)B(n)(u^d(n)-R^{-1}(n)B^T(n)s(n+1)) \quad (15)$$

More substitutions and algebra result in the following Riccati difference equation:

$$P(n) = Q(n) + A^T(n)P(n+1)M(n)A(n) \quad (16)$$

$$s(n) = A^T(n)(I - P(n+1)M(n)B(n)R^{-1}(n)B^T(n)) \times s(n+1) + A^T(n)P(n+1)M(n)B(n)u^d(n) - Q(n)x^d(n) \quad (17)$$

The equations (16) and (17) are solved together backward in time ((17) is unnecessary if $x^d(n)$ and $u^d(n)$ are zero), resulting in the sequences of $P(n)$ and $s(n)$ used for forward computations of optimal control and state trajectories.

According to the algorithm, the optimal control sequence is determined iteratively. The control sequence at iteration $k+1$ is determined on the basis of the control sequence at stage k, $U_k=[u^T(0)\ u^T(1) \ldots u^T(N-1)]$, and the corresponding state sequence $X_k=[X^T(1)\ X^T(2) \ldots X^T(N)]$. The system (5) is linearized around the trajectory of $U_k$ and $X_k$, as in (6). The Riccati difference equation (16) and equation (17) are then solved to refine the control sequence based on (9) which defines $\overline{U}_k=[\overline{u}^T(0)\ \overline{u}^T(1) \ldots \overline{u}^T(N-1)]$, each $\overline{u}$ denoting the left-hand side of (9). Thus, the control sequence at iteration $k+1$ is determined as $$U_{k+1}=U_k+\gamma_k\overline{U}_k \quad (18)$$

where $\gamma_k>0$ is a stepsize determined on the basis of line search (small constant stepsize almost always suffices).

The key point of this optimization algorithm is its iterations with gradually refined controls. The iterative nature is due to pointwise linearization of the nonlinear system (5).

Though the original algorithm assumes unconstrained state and control variables, the algorithm also applies to constrained problems as well. At least, control constraint handling can be done naturally, in the spirit of interior point optimization methods, e.g., by changing (18) to $$U_{k+1}=U_k+\text{diag}\{\Gamma_k\}\overline{U}_k \quad (19)$$

where $\Gamma_k$ is an N×N diagonal matrix, its diagonal diag $\{\Gamma_k\}$ with components set to zero for those control vectors u which are about to violate the control constraints.

During this iterative optimization of the control variables, the control variables remain fixed during each forward iteration in time while the state variables vary. Conversely, during the next iteration, i.e. backwards in time, the state variables remain fixed in time while the control variables change in value. Thus, by iteratively repeating the sequence, an overall sequence of the optimal control values is obtained.

Following the optimization of the control variables at step 20, step 20 then proceeds to step 30 where the optimized control sequences with the optimized control variables are then mapped to a recurrent neural network. This is accomplished using conventional training of the neural network.

From the foregoing, it can be seen that the present invention provides a "hybrid" method for the optimal control of a nonlinear discrete time system. More specifically, rather than simply use a neural network with conventional training techniques in order to attempt optimization of the system, in the present invention the control variables are calculated by using iterative computations and in which the control variables are independent of each other. In doing so, the final optimized control values, after mapping to the recurrent neural network, mitigate the previously known disadvantages of local minima for the subsequently trained recurrent neural network.

Having described my invention, however, many modifications thereto will become apparent to those skilled in the art to which it pertains without deviation from the spirit of the invention as defined by the scope of the appended claims.

I claim:

1. A method for approximation of optimal control for nonlinear discrete time systems comprising the steps of:
   obtaining state variables from a system model,
   iteratively generating control sequences to optimize desired control variables for subsequent training a recurrent neural network, the value of each said control variable being independent of the other control variables,
   mapping said control variables onto the recurrent neural network implemented by a processor and the neural network has the following form, $$x(n+1)=f(x(n),u(n)),$$

$$y(n+1)=h(x(n+1)),$$

where:
   n=time increment,
   u=control variable,
   x=state variable,
   y=output vector,
   f and h are differentiable functions, and generating an optimal control sequence with the following form, $$x(n+1)=A(n)x(n)+B(n)u(n),$$

$$\lambda^T(n)=\Delta x^T(n)Q(n)+\lambda^T(n+1)A(n), \text{ and}$$

$$\delta J(n)/\delta u(n)=\Delta u^T(n)R(n)+\lambda^T(n+1)B(n)=0,$$

where:
$A(n)=f_x(x(n), u(n))$ is a state Jacobian of f,
$B(n)=f_u(x(n), u(n))$ is a control Jacobian of f,
$\lambda^T(n)=\delta J(n)/\delta x(n)$ is an adjoint state vector,
$Q(n)$ is a weighting matrix, and
$R(n)$ is a weighting matrix.

2. The method as defined in claim 1 wherein in said generating step all control variables are fixed when sequencing forward in time and wherein all state variables are fixed when sequencing backwards in time.

3. The method as defined in claim 1 wherein said mapping step comprises the step of training said recurrent neural network using said optimized control variables.

4. The method as defined in claim 1 wherein the optimal control sequence further comprises:

$$u(n)=u^d(n)-R^{-1}(n)B^T(n)\lambda(n+1),$$

$$x(n+1)=A(n)x(n)-B(n)R^{-1}(n)B^T(n)\lambda(n+1)+B(n)u^d(n),$$
and $$\lambda^T(n)=Q(n)x(n)+A^T(n)\lambda(n+1)-Q(n)x^d(n), \text{ where:}$$

$u^d(n)$=target control sequence, and
$X^d(n)$=target state sequence.

5. The method as defined in claim 4 wherein the optimal control sequence further comprises:

$$\lambda(n)=P(n)x(n)+s(n),$$

$$x(n+1)=M(n)A(n)x(n)+v(n),$$

where:
$P(N)=Q(N)$,
$s(N)=-Q(N)x^d(N)$,
$M(n)=(I+B(n)R^{-1}(n)B^T(n)P(n+1))^{-1}$,
I=identity matrix, and
$v(n)=M(n)B(n)(u^d(n)-R^{-1}(n)B^T(n) s(n+1))$.

6. The method as defined in claim 5 wherein the optimal control sequence further comprises:

$$P(n)=Q(n)+A^T(n)P(n+1)M(n)A(n),$$

$$s(n)=A^T(n)(I-P(n+1)M(n)B(n)R^{-1}(n)B^T(n))\times s(n+1)+ A^T(n)P(n+1)M(n)B(n)u^d(n)-Q(n)x^d(n).$$

7. The method as defined in claim 6 wherein the step of iteratively generating control sequences further comprises:

$$U_{k+1}=U_k+\gamma_k\overline{U}_k,$$

$$U_{k+1}=U_k+\text{diag}\{\Gamma_k\}\overline{U}_k,$$

where:
$U_k=[u^T(0)\ u^T(1)\ldots u^T(N-1)]$,
$\overline{U}_k=[\overline{u}^T(0)\ \overline{u}^T(1)\ldots \overline{u}^T(N-1)]$,
$\gamma_k$=step size, and
$\Gamma_k$=N×N diagonal matrix.

8. The method as defined in claim 7 wherein in said generating step all control variables are fixed when sequencing forward in time and wherein all state variables are fixed when sequencing backwards in time.

9. The method as defined in claim 7 wherein said mapping step comprises the step of training said recurrent neural network using said optimized control variables.

* * * * *